May 15, 1962 E. J. JANKOWSKY ETAL 3,034,340
ELECTRICAL CRACK MEASURING DEVICE FOR
DETERMINING METAL DETERIORATION
Filed Feb. 17, 1960 2 Sheets-Sheet 1

INVENTOR.
Edward J. Jankowsky
Walter Beck
Forrest S. Williams
BY
Arthur L. Collins
ATTORNEY May 15, 1962     E. J. JANKOWSKY ETAL     3,034,340
ELECTRICAL CRACK MEASURING DEVICE FOR
DETERMINING METAL DETERIORATION
Filed Feb. 17, 1960     2 Sheets-Sheet 2
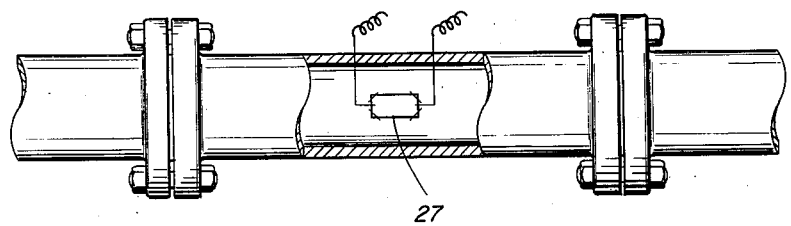
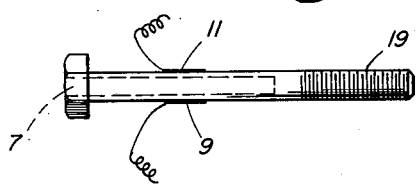 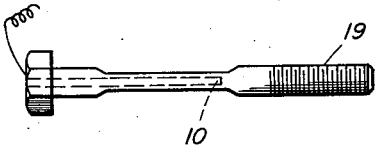
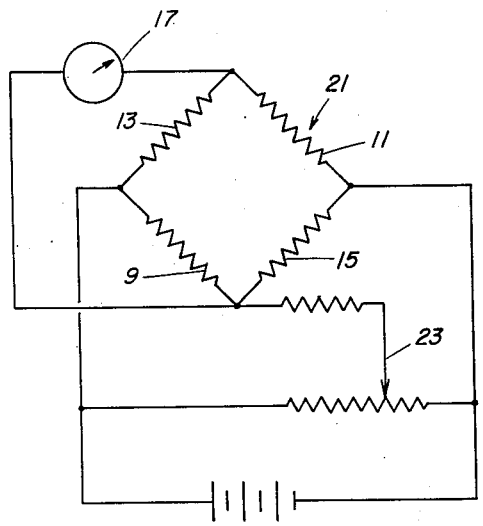
INVENTOR.
Edward J. Jankowsky
Walter Beck
BY Forrest S. Williams
ATTORNEY

United States Patent Office 3,034,340
Patented May 15, 1962

3,034,340
ELECTRICAL CRACK MEASURING DEVICE FOR DETERMINING METAL DETERIORATION
Edward J. Jankowsky, Pensauken, N.J., and Walter Beck, Philadelphia, and Forrest S. Williams, Springfield, Pa., assignors to the United States of America as represented by the Secretary of the Navy
Filed Feb. 17, 1960, Ser. No. 9,397
4 Claims. (Cl. 73—86)
(Granted under Title 35, U.S. Code (1952), sec. 266)

The invention described herein may be manufactured and used by or for the Government of the United States of America for governmental purposes without the payment of any royalties thereon or therefor.

This invention relates to methods and apparatus for testing corrosion and erosion rates. More specifically the invention relates to apparatus suitable for testing the crack initiation, propagation and ultimate failures of metals due to hydrogen embrittlement.

One of the most baffling problems encountered in the use of high strength steels is the occurrence of brittle delayed failures in the steel due to the presence of hydrogen. Heretofore hydrogen embrittlement has been measured by means of bend, tensile and sustained loading tests made on various types of specimens. The test specimens were placed in special apparatus wherein the industrial conditions were simulated. Each of the above methods requires that the specimen be removed from the corrosive medium to determine the extent of the corrosion damage. In some cases, for example, when the specimen is inside of a pipeline in a field test, this removal is quite costly and time consuming. Such an arrangement has been found satisfactory in some environments in which little difficulty is encountered as a result of interrupting flow through the pipe so that the specimen may be examined. We have found, however, that it is more desirable to measure the corrosion or enmbrittlement within the pipe without taking it apart. Accordingly, we have devised an electrical measuring combination which permits the extent of crack initiation and propagation resulting in ultimate failure to be determined by measurements made without disassembling the pipe.

It is, therefore, one object of this invention to provide a highly sensitive and accurate means for measuring and visibly indicating the time to failure and rate of crack propagation of high strength steel when subjected to stress in a corrosive environment.

Another object of the invention is to reproduce these indications at a remote point.

Another object is to provide means for making a continuous record of specimen behavior.

A further object is to provide a testing device which is easily and inexpensively prepared.

A still further object of this invention is to provide an apparatus which electrically and automatically measures and records the extent of corrosion, erosion or embrittlement of a specimen maintained within an industrial stream.

With these objects in view and others that will develop in the ensuing description, the invention generally stated, comprises placing a notched C-ring specimen under a predetermined stress by tightening a bolt to which strain gages are attached. The strain gages form arms of a bridge circuit. Temperature compensating strain gages attached to a bolt similar to the stressing bolt, form the opposite arms of the circuit. A recording device is used to measure unbalance in the bridge circuit resulting from strain in the stressing bolt. Cracking in the specimen results in a reduction in bolt load and a corresponding change in bolt strain which is picked up by the strain gages and recorded.

The system employed is based on the fact that the restraining load on a stressed hydrogen embrittled notched C-ring, decreases with increasing crack growth and the strain upon a bolt used for stressing the specimen is reduced accordingly. Calibration of the bolt may be accomplished by stressing the specimen a known amount and observing the corresponding indication of the instrument.

Other objects and many of the attendant advantages of this invention will be readily appreciated as the same becomes better understood by reference to the following detailed description which is considered in connection with the accompanying drawings wherein:

FIGURE 3 shows a view of a pipe together with a test specimen combination according to our invention.

FIGURE 4 shows a bolt having the strain gages on the outside thereof.

FIGURE 5 shows a hollow bolt having the strain gage contained therein.

FIGURE 6 is an electrical wiring diagram illustrating means for transmitting indications of the gauge to a remote point and for recording the same, if desired.

Figures 1, 2:
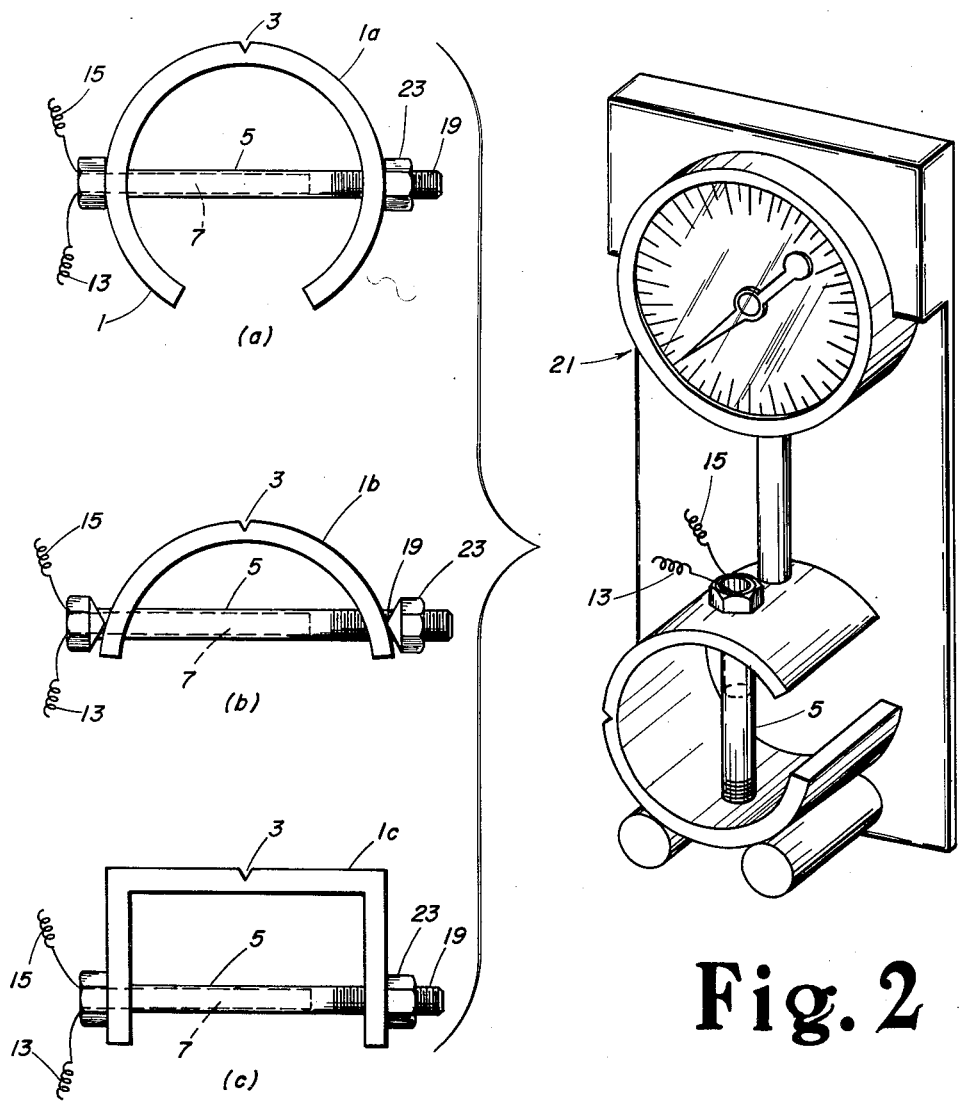
FIGURE 1 is a view of three preferred forms of the test specimen shown mounted on the stressing bolt.
FIGURE 2 shows the means for placing the bolt under a predetermined stress.

In the drawing, 1 is a test specimen. The test specimens are composed of the metal or alloy from which the vessel, conduit, or other equipment under test is fabricated. It is to be understood that the test specimen may take other forms than those shown in FIGURE 1. FIGURE 1a shows a specimen in the form of a C-ring, 1b shows a specimen in the form of a semi-circle, and 1c shows a specimen in the form of a rectangle. A V-shaped notch 3 is provided at the top of the specimen. The purpose of the notch is to approach a condition of tri-axial stress wherein the sensitivity and reproducibility of cracking times are greatly enhanced. Under conditions requiring less sensitivity the notch would not be necessary.

The wall of the test specimen has an opening therethrough, into which the bolt means 5 is mounted. The bolt is made out of any suitable metal such as steel or aluminum. The bolt 5 is either provided with a hole 7 drilled into its center as is shown in FIGURE 4 or else it has a small section reduced to a very thin diameter as is shown in FIGURE 5. The strain gages 9 and 11 may either be attached to the outside of the hollow bolt (FIG. 4) or a single gage 10 may be placed inside of the bolt (FIG. 5). An advantage of the strain gage inside of the bolt is that it is protected against corrosive attack.

As shown in FIGURE 2 the stressing bolt is calibrated in terms of strain produced by an applied load. This is accomplished by threading the bolt at one end 19; the specimen is squeezed together so as to register a predetermined load in terms of deflection upon the stress machine 21. The nut 23 or the like is then tightened by turning it on the threads 19 until it abuts the specimen. In this manner it is possible to adjust the specimen to various loads.

In a typical apparatus and operation, the specimen 1a comprised a notched C-ring consisting of 1¼″ sections cut from tubing, 2″ x O.D. x ⅛″ wall thickness of AISI 4340 steel. The notch 3 was cut by careful grinding after heat treatment. Some of the specimens were plated with cadmium from either a fluoborate or a cyanide solution. Others were plated with chromium from a standard chromic-sulfuric acid bath. The specimens were stressed by tightening the bolt 5 as explained above. The same stress was applied in all cases. The strain gages 9 and 11 were suitably attached to the bolt 5. In another embodiment a single gage 10 was placed inside of the bolt shown in FIGURE 5. Identical results were obtained with both types of bolts.

Referring to the wiring diagram illustrated in FIGURE 6, the strain gages 9 and 11 formed two arms of a bridge circuit 21. The other arms 13 and 15 consisted of two strain gages attached to a similar bolt (not shown) for temperature compensation. The output currents of the strain gages were recorded by the oscillograph or the like 17 through the indicator 23. The oscillograph may be replaced by any recording or indicating instrument sufficiently sensitive to measure the unbalance in the bridge circuit. By making the proper conversions of the values of the output current taken from the oscillographic recording, it was possible to measure the time to failure and rate of crack propagation in cadmium and chromium plated rings of high strength steel.

In addition to the specific application just described, the principles of our invention may also be applied to other situations as shown in FIGURE 3. The specimen could be placed by a suitable carrier 27 inside of a pipe. The corrosive effects of the fluid passing through the pipe could be measured and continuously recorded without dismantling the pipe. The specimen would be made of the same material as the pipe and subjected to the same stress as that of the pipe. In this manner the actual working conditions could be simulated.

Other applications of this method and apparatus would be to test for aggressive elements in the soil prior to placing steel footings therein by placing the specimen into the ground. The testing of tanks, pipes and other such apparatus used for containing and holding highly corrosive substances could be accomplished by placing a suitable specimen inside of the tank.

From the above it will be apparent that we have attained the objects of our invention and provided a novel and useful system for corrosion testing in an industrial system. The invention has been described in terms of a specific example. However, it should be understood that this is by way of illustration only and that the invention is not limited thereto. Alternative embodiments and operating techniques will become apparent to those skilled in the art in view of our disclosure and accordingly modifications of our invention are contemplated without departing from the spirit of the described invention or from the scope of the appended claims.

What is claimed is:
1. An apparatus for testing embrittlement of corrodible metal vessels which comprises a corrosion test sample being made of the metal of the vessel in the shape of a C-ring, said ring being exposed in a corrosive medium; bolt means passing through and bridging the free ends of the C-ring thereby subjecting the specimen to a predetermined stress; strain responsive wire elements mounted upon the exterior surfaces of the bolt so as to be sensitive to strain variation; source means for supplying a current through said strain responsive element; indicating means for obtaining an indication of the change in strain in the bolt; and wire means connecting said source means with said indicating means whereby the rate of crack propagation in the test sample can be observed while the sample is exposed to the corrosive medium.

2. An apparatus for testing embrittlement of corrodible metal vessels which comprises a corrosion test sample having a notch in the top thereof, said test sample being made of the metal of the vessel in the shape of a C-ring, said ring being exposed within a corrosive medium; an elongated bolt passing through and bridging the free ends of the C-ring thereby subjecting the specimen to a predetermined stress; strain responsive wire elements mounted upon the exterior surfaces of the bolt so as to be sensitive to strain variations; source means for supplying a current through said strain responsive elements; indicating means for obtaining an indication of the charge in strain in the bolt; and wire means connecting said source means with said indicating means whereby the rate of crack propagation in the test sample can be observed while the sample is exposed to the corrosive medium.

3. An apparatus for testing embrittlement of corrodible metal vessels which comprises a corrosion test sample being in the shape of a C-ring and having a notch in the top thereof, said test sample being made of the metal of the vessel and being exposed within a corrosive medium; an elongated, longitudinally-bored bolt passing through and bridging the free ends of the C-ring subjecting the specimen to a predetermined stress; a strain responsive wire element centrally mounted within the bore of the bolt; source means for supplying a current through said strain responsive element; means for compensating for an increase in temperature of the specimen so that temperature compensated strain determinations may be obtained from the said strain responsive element; indicating means for obtaining an indication of the change in strain in the bolt; and wire means connecting said source means with said indicating means whereby the rate of crack propagation in the test sample can be observed while the sample is exposed to the corrosive medium.

4. The apparatus as defined in claim 3 wherein the compensating means include a bridge circuit, one arm of which comprises the strain responsive element and the opposite arm of which comprises a strain sensitive element which is free of strain due to stress whereby the effects due to temperature variation are minimized.

References Cited in the file of this patent
UNITED STATES PATENTS

| | | |
|---|---|---|
| 2,477,026 | Wenk et al. | July 26, 1949 |
| 2,600,029 | Stone | June 10, 1952 |
| 2,976,123 | Marsh et al. | Mar. 21, 1961 |

OTHER REFERENCES

Bulletin 443, U.S. Department of the Interior, Bureau of Mines, "Intercrystalline Cracking of Boiler Steel and Its Prevention" by W. C. Schroeder, et al.